US011341466B2

(12) United States Patent
Feng et al.

(10) Patent No.: US 11,341,466 B2
(45) Date of Patent: May 24, 2022

(54) TRANSFERRING DIGITAL TICKETS BASED ON BLOCKCHAIN NETWORKS

(71) Applicant: Advanced New Technologies Co., Ltd., Grand Cayman (KY)

(72) Inventors: Zhiyuan Feng, Hangzhou (CN); Yanpeng Li, Hangzhou (CN); Long Cheng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 121 days.

(21) Appl. No.: 16/671,072

(22) Filed: Oct. 31, 2019

(65) Prior Publication Data
US 2020/0320488 A1 Oct. 8, 2020

Related U.S. Application Data

(63) Continuation of application No. PCT/CN2019/081687, filed on Apr. 8, 2019.

(51) Int. Cl.
*G06Q 20/04* (2012.01)
*H04L 9/06* (2006.01)
(Continued)

(52) U.S. Cl.
CPC ....... *G06Q 20/0457* (2013.01); *H04L 9/0637* (2013.01); *H04L 9/30* (2013.01); *H04L 9/3247* (2013.01)

(58) Field of Classification Search
CPC ............... G06Q 20/0457; G06Q 20/10; G06Q 30/0207; H04L 9/0637; H04L 9/30;
(Continued)

(56) References Cited

U.S. PATENT DOCUMENTS 7,444,676 B1 * 10/2008 Asghari-Kamrani ... G06F 21/31
726/21
10,158,480 B1 * 12/2018 Winklevoss .......... H04L 9/3239
(Continued)

FOREIGN PATENT DOCUMENTS

CN 108428122 8/2018
CN 108764993 11/2018
(Continued)

OTHER PUBLICATIONS

Andreas M. Antonopoulos, "Mastering Bitcoin", Copyright 2010.*
(Continued)

*Primary Examiner* — Steven S Kim
(74) *Attorney, Agent, or Firm* — Fish & Richardson P.C.

(57) ABSTRACT

Disclosed herein are methods, systems, and apparatus, including computer programs encoded on computer storage media, for blockchain network digital ticket transfer. One of the methods includes receiving a request from a client device to transfer a digital ticket from a blockchain network to a target server by a blockchain network node. The blockchain network node determines whether the client device is authorized to transfer the digital ticket based on a digital signature in the request, and transmits a notification message to the target server if the digital signature is valid. The blockchain network node receives a confirmation message from the target server indicating validity of the client device, and transfers the digital ticket to the target server.

19 Claims, 7 Drawing Sheets

(51) Int. Cl.
*H04L 9/30* (2006.01)
*H04L 9/32* (2006.01)

(58) Field of Classification Search
CPC ..... H04L 9/3242; H04L 9/347; H04L 9/3247; H04L 2209/38
See application file for complete search history.

(56) References Cited

U.S. PATENT DOCUMENTS

| | | | |
|---|---|---|---|
| 2005/0049950 A1* | 3/2005 | Johnson | G06Q 20/3433 705/35 |
| 2006/0167792 A1* | 7/2006 | Hahn-Carlson | G06Q 40/12 705/40 |
| 2007/0078751 A1* | 4/2007 | Craig | G06Q 40/04 705/37 |
| 2010/0145860 A1* | 6/2010 | Pelegero | G06Q 20/3223 705/71 |
| 2012/0173422 A1* | 7/2012 | Hu | G06Q 20/0425 705/44 |
| 2012/0303503 A1* | 11/2012 | Cambridge | H04L 63/08 705/35 |
| 2013/0226799 A1* | 8/2013 | Raj | G07C 9/00 705/44 |
| 2015/0332256 A1* | 11/2015 | Minor | G06Q 20/3678 705/69 |
| 2016/0267474 A1 | 9/2016 | Lingham et al. | |
| 2016/0342976 A1* | 11/2016 | Davis | G06Q 20/065 |
| 2017/0200147 A1* | 7/2017 | Ansari | G06Q 20/349 |
| 2018/0053160 A1* | 2/2018 | Schwartz | G06Q 20/389 |
| 2018/0075453 A1* | 3/2018 | Durvasula | G06Q 20/4016 |
| 2018/0197167 A1* | 7/2018 | Ganesan | G06Q 20/0425 |
| 2018/0253745 A1* | 9/2018 | Webster | H04L 9/0816 |
| 2018/0257306 A1* | 9/2018 | Mattingly | H04L 9/0643 |
| 2018/0365764 A1* | 12/2018 | Nelson | G06Q 40/025 |
| 2019/0012695 A1* | 1/2019 | Bishnoi | G06Q 20/367 |
| 2019/0205894 A1* | 7/2019 | Gonzales, Jr | G06Q 20/42 |
| 2019/0280875 A1* | 9/2019 | Ragnoni | H04L 63/12 |

FOREIGN PATENT DOCUMENTS

| | | |
|---|---|---|
| CN | 108876360 | 11/2018 |
| CN | 109191194 | 1/2019 |
| CN | 109544152 | 3/2019 |
| JP | 2003076910 | 3/2003 |
| JP | 2016524742 | 8/2016 |
| JP | 2019500799 | 1/2019 |
| KR | 101701131 | 2/2017 |
| KR | 101908677 | 10/2018 |
| KR | 101936417 | 1/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.
International Search Report and Written Opinion in International Application No. PCT/CN2019/081687, dated Sep. 29, 2019, 7 pages.
Nakamoto, "Bitcoin: A Peer-to-Peer Electronic Cash System," www.bitcoin.org, 2005, 9 pages.
Cha et al., "A Blockchain-Based Privacy Preserving Ticketing Service", 2018 IEEE 7th Global Conference on Consumer Electronics, Oct. 2018, pp. 585-587.
Extended European Search Report in European Application No. 19732231.6, dated Mar. 6, 2020, 8 pages.
Tackmann, "Secure Event Tickets on a Blockchain", International Conference on Financial Cryptography and Data Security, Sep. 2017, 8 pages.

* cited by examiner

TRANSFERRING DIGITAL TICKETS BASED ON BLOCKCHAIN NETWORKS

CROSS-REFERENCE TO RELATED APPLICATIONS

This application is a continuation of PCT Application No. PCT/CN2019/081687, filed on Apr. 8, 2019, which is hereby incorporated by reference in its entirety.

TECHNICAL FIELD

This specification relates to transferring digital tickets based on blockchain networks.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

A blockchain network can be used for implementing an electronic trading platform of one or more servers that trades in goods or services. Users of the electronic trading platform can have user accounts at the electronic trading platform that hold various digital tickets. Examples of a digital ticket can include an electronic voucher, an electronic coupon, or an electronic gift certificate. In some instances, a user may want to use the digital ticket for goods or services at another electronic trading platform. However, in existing systems, a digital ticket at one electronic trading platform is usually not allowed to be used at another electronic trading platform or server.

Thus, it would be desirable to provide a solution to allowing a digital ticket to be used at multiple electronic trading platforms or servers.

SUMMARY

This specification describes technologies for transferring a digital ticket based on blockchain networks. These technologies generally involve transferring a digital ticket from a blockchain network to a target server of an electronic trading platform such that the digital ticket can be used on the target server. A digital ticket is generally a virtual instance of a ticket for claiming goods or services. Examples of a digital ticket can include an electronic voucher having certain monetary value and can be exchanged for goods and services, an electronic coupon that can be used by consumers at the time of consumption to purchase a product at a discounted price according to a discount rate indicated by the coupon, or an electronic gift certificate that can be used for goods or services at specified merchants, among others. In some embodiments, a client device sends a request to a blockchain network to initiate a transfer of a digital ticket from the blockchain network to a target server. The blockchain network authenticates the client device and verifies whether the target server is allowed to receive the digital ticket. If the client device is authenticated and the target server is allowed to receive the digital ticket, the blockchain network can proceed to transfer the digital ticket to the target server.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
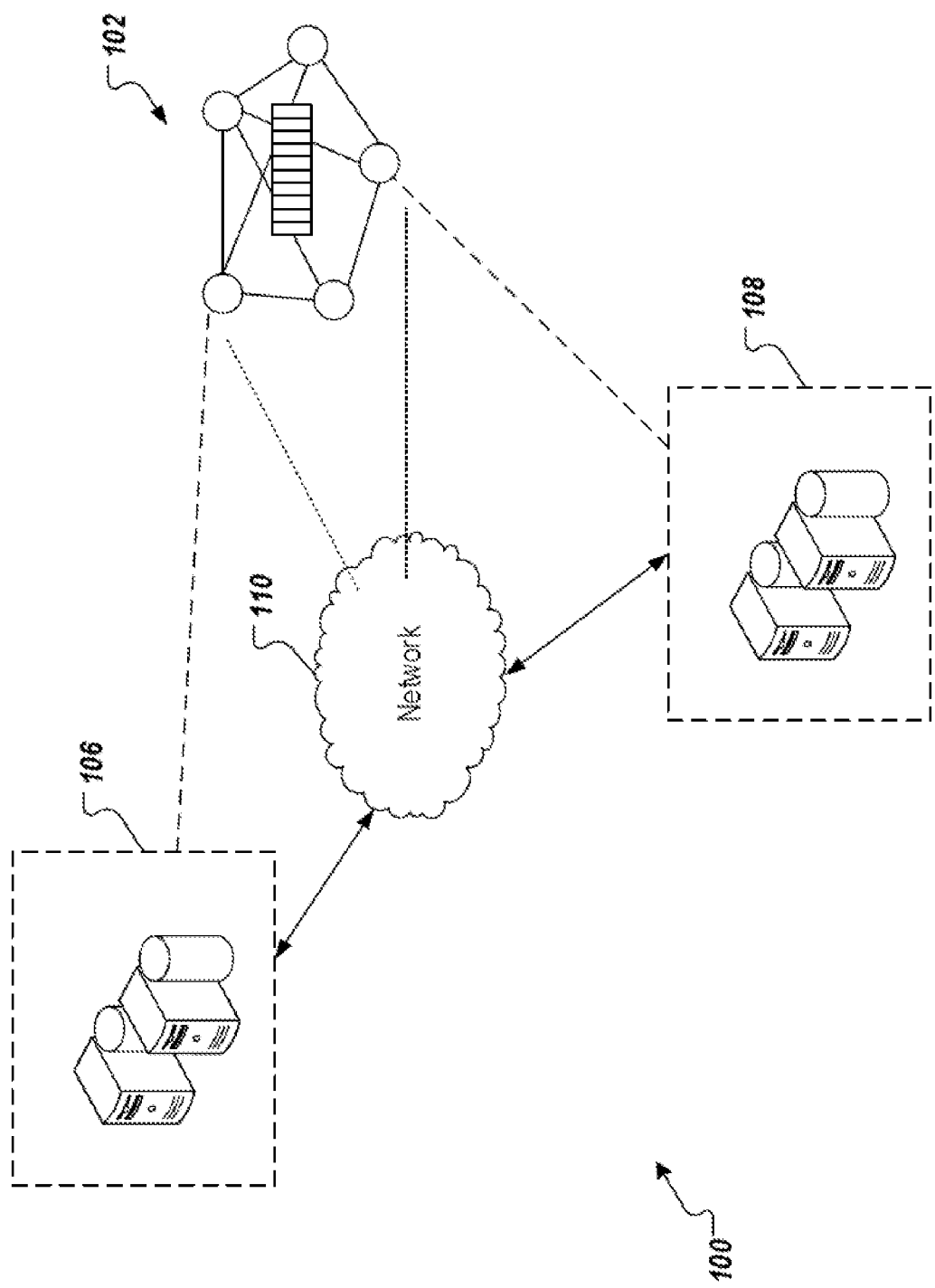
FIG. 1 is a diagram illustrating an example of an environment that can be used to execute embodiments of this specification.

This specification describes technologies for transferring a digital ticket based on blockchain networks. The technologies generally involve transferring a digital ticket from a blockchain network to a target server such that the digital ticket can be used on the target server. A digital ticket is generally a virtual instance of a ticket for claiming goods or services from an electronic trading platform. Examples of a digital ticket can include an electronic voucher having certain monetary value that can be exchanged for goods and services, an electronic coupon that can be used by consumers at the time of consumption to purchase a product at a discounted price according to a discount rate indicated by the coupon, or an electronic gift certificate that can be used for goods or services at specified merchants.

In some embodiments, a client device sends a request to a blockchain network to initiate a transfer from the blockchain network to a target server of an electronic trading platform. The blockchain network authenticates the client device and verifies whether the target server is allowed to receive the digital ticket. If the client device is authenticated and the target server is allowed to receive the digital ticket, the blockchain network can proceed to transfer the digital ticket to the target server.

The techniques described in this specification can produce one or more technical effects. In some embodiments, when a client device submits a request to transfer a digital ticket from a blockchain network to a target server of an electronic trading platform, the blockchain network authenticates the client device. In some embodiments, an authenticated client device can be allowed to transfer the digital ticket, while a client device that fails authentication is prohibited from transferring the digital ticket. This can prevent data (e.g., the digital ticket) stored in the blockchain network from being compromised by malicious actors, thereby improving the data security of the blockchain network. In some embodiments, the blockchain network verifies whether the target server has registered a blockchain account in the blockchain network. If the target server has a blockchain account in the blockchain network, the target server can receive the digital ticket from the blockchain network. If not, the target server cannot receive the digital ticket. This prevents a malicious account holder imitating the target server from obtaining the digital ticket. This can further improve data security in the blockchain network. Moreover, the described transfer procedure is performed based on blockchain networks. Due to the tamper-resistant and traceable-nature of blockchain networks, the transfer procedure can be trusted by users of the procedure. If the digital ticket is lost or altered during transfer, the transfer procedure can be traced using the blockchain technology and the digital ticket can be properly retrieved. In some embodiments, operations performed during the digital ticket transfer procedure involving the blockchain network are executed based on blockchain transactions. The blockchain transactions are stored in one or more network nodes of the blockchain network. If a digital ticket is lost or altered during transmission, the blockchain transactions recorded in the blockchain network can be used as an evidence of the transfer procedure and to properly retrieve the digital ticket.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
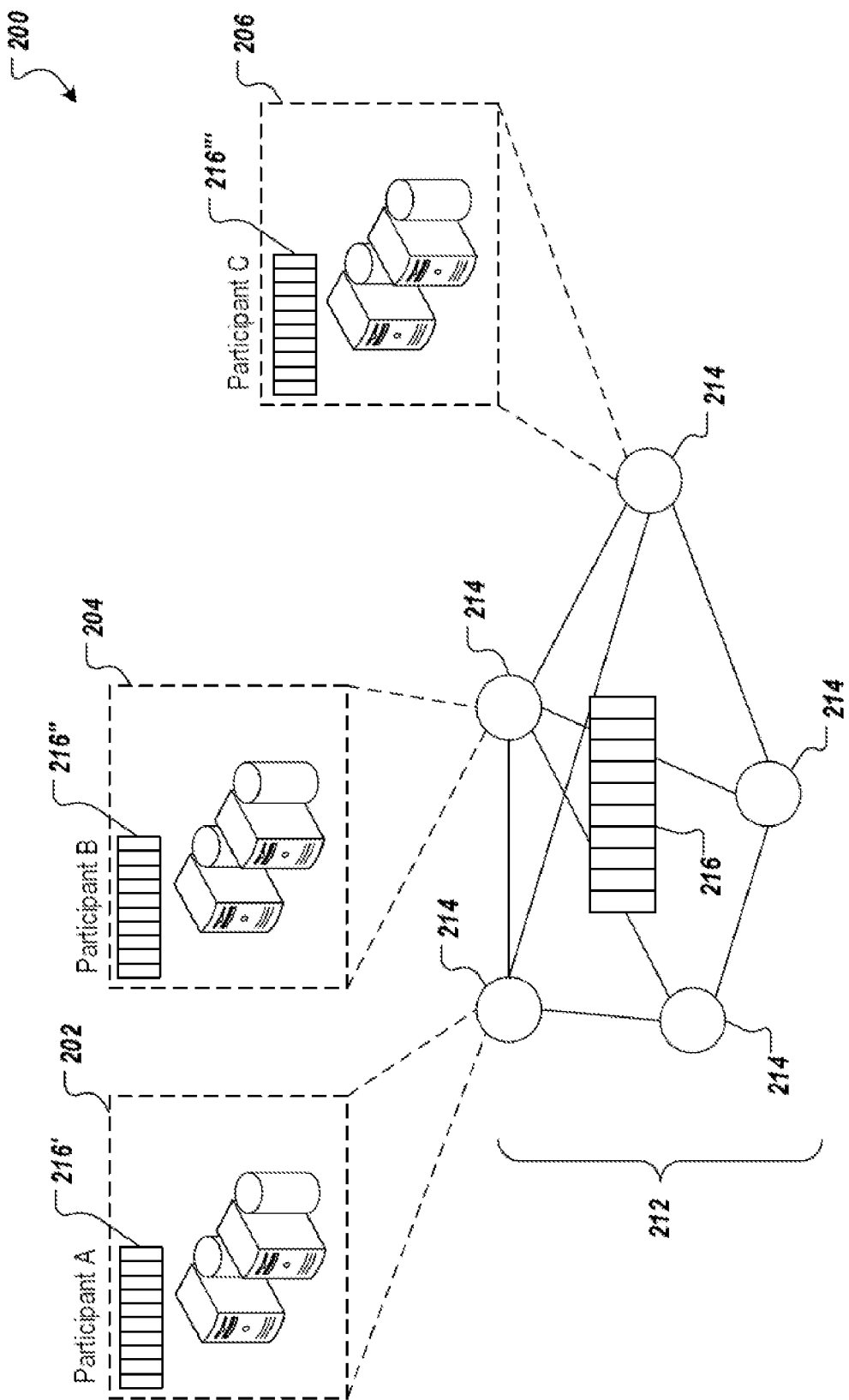
FIG. 2 is a diagram illustrating an example of an architecture in accordance with embodiments of this specification.

FIG. 2 depicts an example of an architecture 200 in accordance with embodiments of this specification. The conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
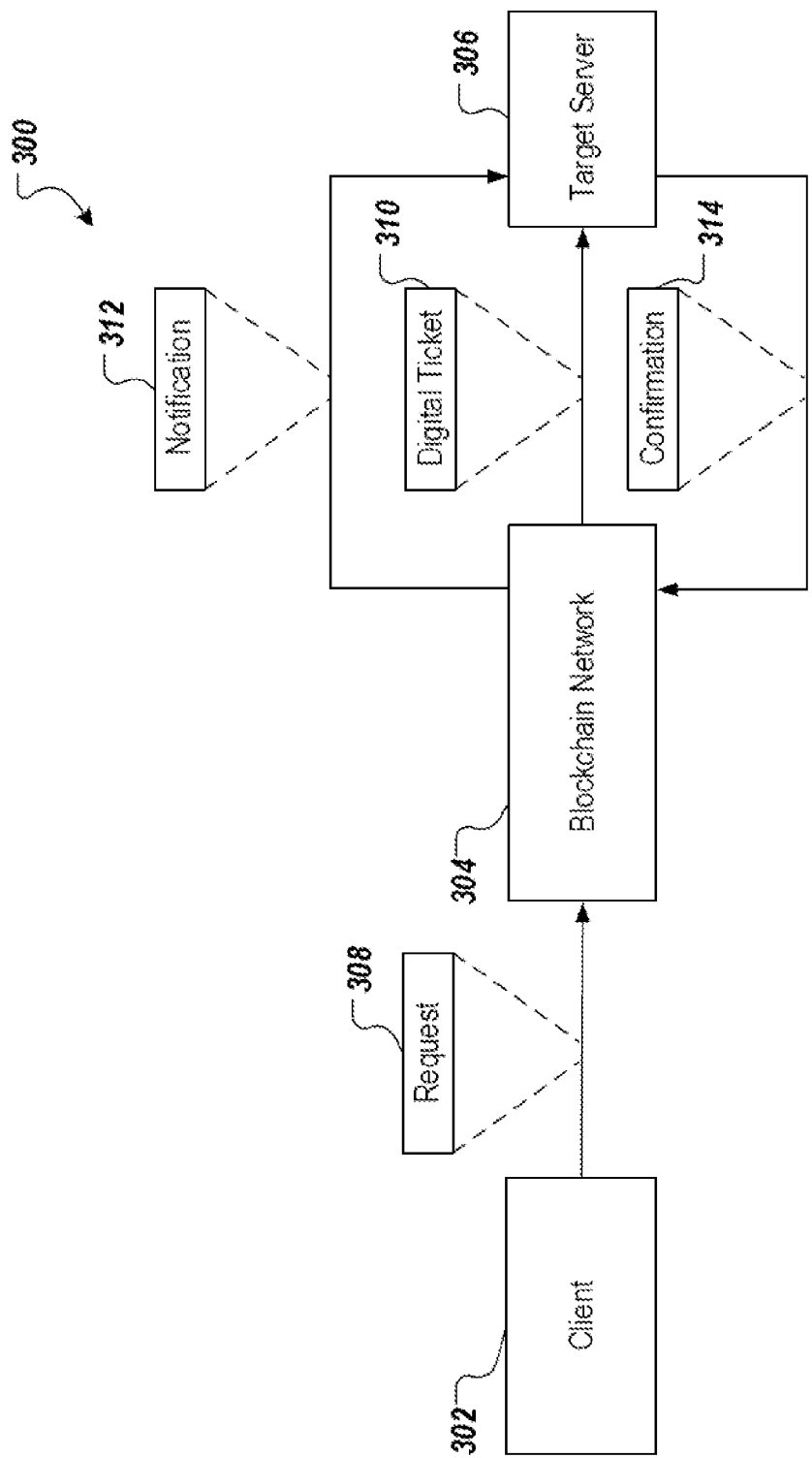
FIG. 3 is a diagram illustrating an example of a system in accordance with embodiments of this specification.

FIG. 3 is a diagram illustrating an example of a system 300 that transfers digital tickets from blockchain networks. As shown, system 300 includes a client device 302, a block chain network 304, and a target server 306. In some embodiments, the target server 306 is externally-located in relation to the blockchain network 304. The client device 302 and the target server 304 can be any suitable computer, module, server, or computing element programmed to perform the methods described herein. The blockchain network 304 can include a number of blockchain network nodes configured to communicate with the client device 302 and the target server 304. In some embodiments, a blockchain network node of the blockchain network 304 can perform the transfer procedure of a digital ticket with the client device 302 and the target server 304. In general, system 300 provides a solution to transferring a digital ticket 310 from the blockchain network 304 to the target server 306 such that the transfer procedure is traceable and trusted by participants of the transfer.

In some embodiments, a digital ticket 310 is a virtual instance of a ticket for claiming goods or services. Examples of a digital ticket 310 can include an electronic voucher having certain monetary value and can be exchanged for goods and services, an electronic coupon that can be used by consumers at the time of consumption to purchase a product at a discounted price according to a discount rate indicated by the coupon, or an electronic gift certificate that can be used for goods or services at specified merchants.

Generally in operation, a client (e.g., client device 302) sends a request 308 to the blockchain network 304 to transfer a digital ticket 310 from the blockchain network 304 to the target server 306. In some embodiments, the request includes identity information of the client device 302 (e.g., a digital signature of the client device 302) and account information (e.g., an account identifier) of the client device 302 on the target server 306. In response to the request, the blockchain network 304 authenticates the client device 302 based on the identity information in the request. If the authentication is successful, the blockchain network 304 determines that the client device 302 is authorized to transfer the digital ticker 310 and sends a notification 312 to the target server 306 indicating that the digital ticket 310 is to be transferred from the blockchain network 304 to the target server 306. In some embodiments, the notification 312 includes the account information of the client device 302 on the target server 306.

After receiving the notification 312 from the blockchain network 304, the target server 306 verifies the account information of the client device 302. For example, the target server 306 can determine whether the client device 302 has an existing account on the target server 306 based on the account information. If the account information is valid, the target server 306 transmits a confirmation message 314 to the blockchain network 304 indicating validity of the account information of the client device 302. If the account information is not valid, the target server 306 transmits a rejection message to the blockchain network 304 indicating that the account information of the client device 302 is not valid and that the client device 302 is prohibited from transferring the digital ticket 310 from the blockchain network 304 to the target server 306.

After receiving the confirmation message 314 from the target server 306, the blockchain network 306 can transfer the digital ticket 310 to the target server 306 and notify the client device 302 of completion of the transfer. If the rejection message is received from the target server 306, the blockchain network 306 can send a warning message to the client device 302 indicating that the account information of the client device 302 on the target server 306 is not valid and that the transfer request cannot be fulfilled.

In alternative embodiments, a client device 302 can send a request to the target server 306 to initiate the transfer procedure of the digital ticket 310 from the blockchain network 304 to the target server 306. The target server 306 can generate a digital token for the transfer in response to the request and transmit the digital token to the client device 302. In some embodiments, the digital token can include a random identifiable string, or a two dimensional code (e.g., a bar code or quick response (QR) code) that corresponds to an account of the client device 302 on the target server 306 and that is recognizable by the target server 306. The digital token can be used to facilitate transferring the digital ticket 310 from the blockchain network 304 to the target server 306. In some embodiments, the target server 306 sends a notification message that includes the digital token to the blockchain network 304 indicating that the digital ticket 310 is to be transferred from the blockchain network 304 to the target server 306.

After receiving the digital token from the target server 306, the client device 302 processes the digital token (e.g., scans the bar code or QR code) and determines whether the digital token corresponds to an account of the client device 302, and if so, submits a transfer transaction to the blockchain network 304. In some embodiments, the transfer transaction includes a digital signature of the client device and the digital token that is associated with the digital ticket 310. If determining that the digital token does not correspond to an account of the client device 302, the client device 302 can terminate the transfer procedure.

After receiving the transfer transaction from the client device 302, the blockchain network 304 can authenticate the client device 302 by verifying the digital signature in the transfer transaction. In some embodiments, the blockchain network 304 can also compare the digital token in the transfer transaction with the digital token previously received from the target server. If the client device 302 is successfully authenticated and the two tokens match, the blockchain network 304 can transfer the digital ticket 310 to the target server 306.

Figure 4:
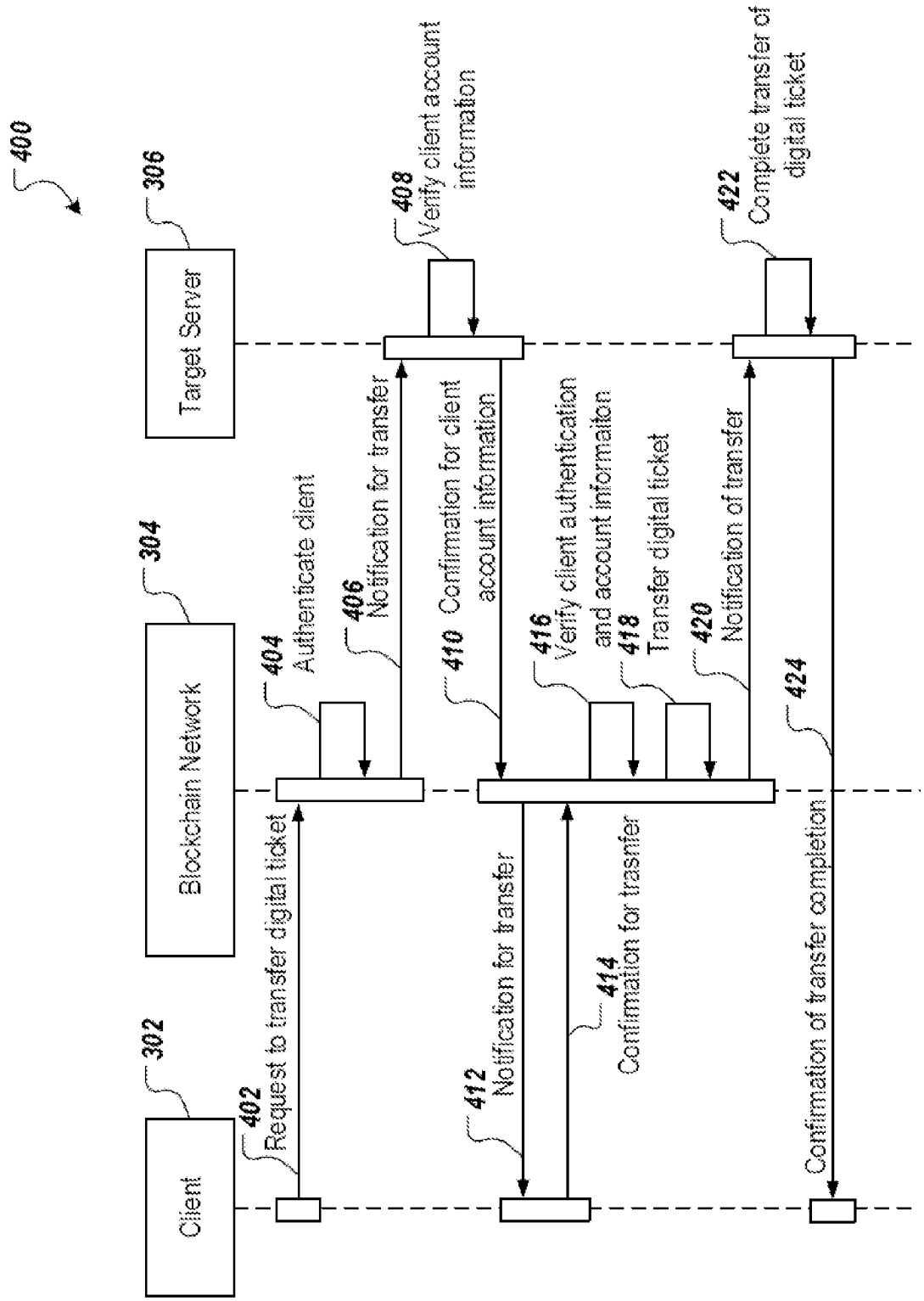
FIG. 4 depicts an example of a process that can be executed in accordance with embodiments of this specification.

FIG. 4 depicts an example of a signal flow 400 in accordance with embodiments of this specification. The signal flow 400 represents a process for transferring a digital ticket based on a blockchain network. For convenience, the process will be described as being performed by a system of one or more computers, located in one or more locations, and programmed appropriately in accordance with this specification. For example, a distributed system (e.g., the environment 100 of FIG. 1; the system 300 of FIG. 3), appropriately programmed, can perform the process.

The process 400 starts at 402 where a client device 302 sends a request 308 to the blockchain network 304 to transfer a digital ticket 310 from the blockchain network 304 to the target server 306. In some embodiments, the request includes identity information of the client device 302 (e.g., a digital signature of the client device 302 generated using a private key), an identifier of the digital ticket 310, an identifier of the target server 306, and account information (e.g., an account identifier) of the client device 302 on the target server 306.

At 404, in response to the request, the blockchain network 304 authenticates the client device 302 based on the identity information in the request. In some embodiments, the blockchain network 304 authenticates the client device 302 using a public key to verify the digital signature in the request. If the signature is valid, the client device 302 is authenticated. If the authentication is successful, the blockchain network 304 determines that the client device 302 is authorized to transfer the digital ticket 310. In some embodiments, the blockchain network 304 can generate a blockchain transaction corresponding to the transfer request, and withhold the digital ticket 310 based on the blockchain transaction using a smart contract to prevent further operations on the digital ticket 310 for a predetermined time. If the authentication fails, the blockchain network 304 determines that the client device 302 is not authorized to transfer the digital ticker 310 and rejects the request from the client device 302.

At 406, the blockchain network 304 sends a notification to the target server 306 indicating that the digital ticket 310 is to be transferred from the blockchain network 304 to the target server 306. In some embodiments, the notification includes the account information of the client device 302 on the target server 306.

At 408, the target server 306 verifies the account information of the client device 302 after receiving the notification from the blockchain network 304. In some embodiments, the target server 306 can determine whether the client device 302 has an existing account on the target server 306 based on the account information in the notification. For example, the target server 306 can compare an account identifier of the client device 302 in the notification with the account identifiers of client accounts stored in the target server 306. If there is a match, the target server 306 determines that the account information of the client device 302 is valid. If there is no match, the target server 306 determines that the account information of the client device 302 is not valid.

At 410, the target server 306 transmits a confirmation message to the blockchain network 304 after determining that the account information of the client device 302 is valid. The confirmation message indicates validity of the account information of the client device 302. In some embodiments, if the account information is not valid, the target server 306 transmits a rejection message to the blockchain network 304 indicating that the account information of the client device 302 is not valid and that the client device 302 is prohibited from transferring the digital ticket 310 from the blockchain network 304 to the target server 306.

At 412, the blockchain network 304 sends a notification to the client device 302 indicating that the target server 306 is ready for the transfer of the digital ticket 310 and requesting the client device 302 to confirm starting the transfer.

At 414, the client device 302 sends a confirmation message to the blockchain network in response to the notification. The confirmation message indicates that the client device 302 has confirmed starting the transfer of the digital ticket 310.

At 416, after receiving the confirmation message from the client device 302, the blockchain network 304 verifies whether the client device 302 has been authenticated and whether the account information of the client device 302 on the target server 306 has been determined to be valid. For example, the blockchain network 304 can perform the verification based on a result of a previous authentication procedure on the client device 302 and a result of a previous verification process on the account information. The blockchain network 304 can further verify an identity of the target server 306. In some embodiments, the blockchain network 304 can store blockchain accounts that are registered by external servers, and the external servers that have a registered blockchain account can be authorized for transferring the digital ticket 310. The blockchain network 304 can determine whether an identifier of the target server 306 matches an identifier of a server having a registered blockchain account. If there is a match, the blockchain network 304 can continue the transfer procedure.

At 418, the blockchain network 304 releases the withholding on the digital ticket 310 and transfers the digital ticket 310 to the target server 306. For examples, operations can no longer be prohibited from performing on the digital ticket 310. In some embodiments, the blockchain network 304 removes the digital ticket 310 from an account of the client device 302 in the blockchain network and sends the digital ticket 310 to an account of the client device 302 on the target server 306. In embodiments where the target server 306 has a blockchain account that is registered in the blockchain network 304, the blockchain network 304 can transfer the digital ticket 310 to the blockchain account of the target server 306.

At 420, the blockchain network 304 transfer a notification to the target server 306 indicating that the digital ticket 310 has been transferred to the target server 306. In some embodiments, the notification notifies the target server 306 of that the digital ticket 310 has been transferred to the enterprise account of the target server 306 in the blockchain network 304.

At 422, the target server 306 receives the notification from the blockchain network 304 and completes transfer of the digital ticket to the target server 306. In some embodiments, the target server 306 determines that the notification indicates that digital ticket 310 has been transferred to the enterprise account of the target server 306 in the blockchain network 304, and associates the digital ticket 310 with an account of the client device 302 on the target server 306.

At 424, the target server 306 sends a confirmation message to the client device 302 indicating that the digital ticket 310 has been successfully transferred from the blockchain network 304 to the target server 306.

Figure 5:
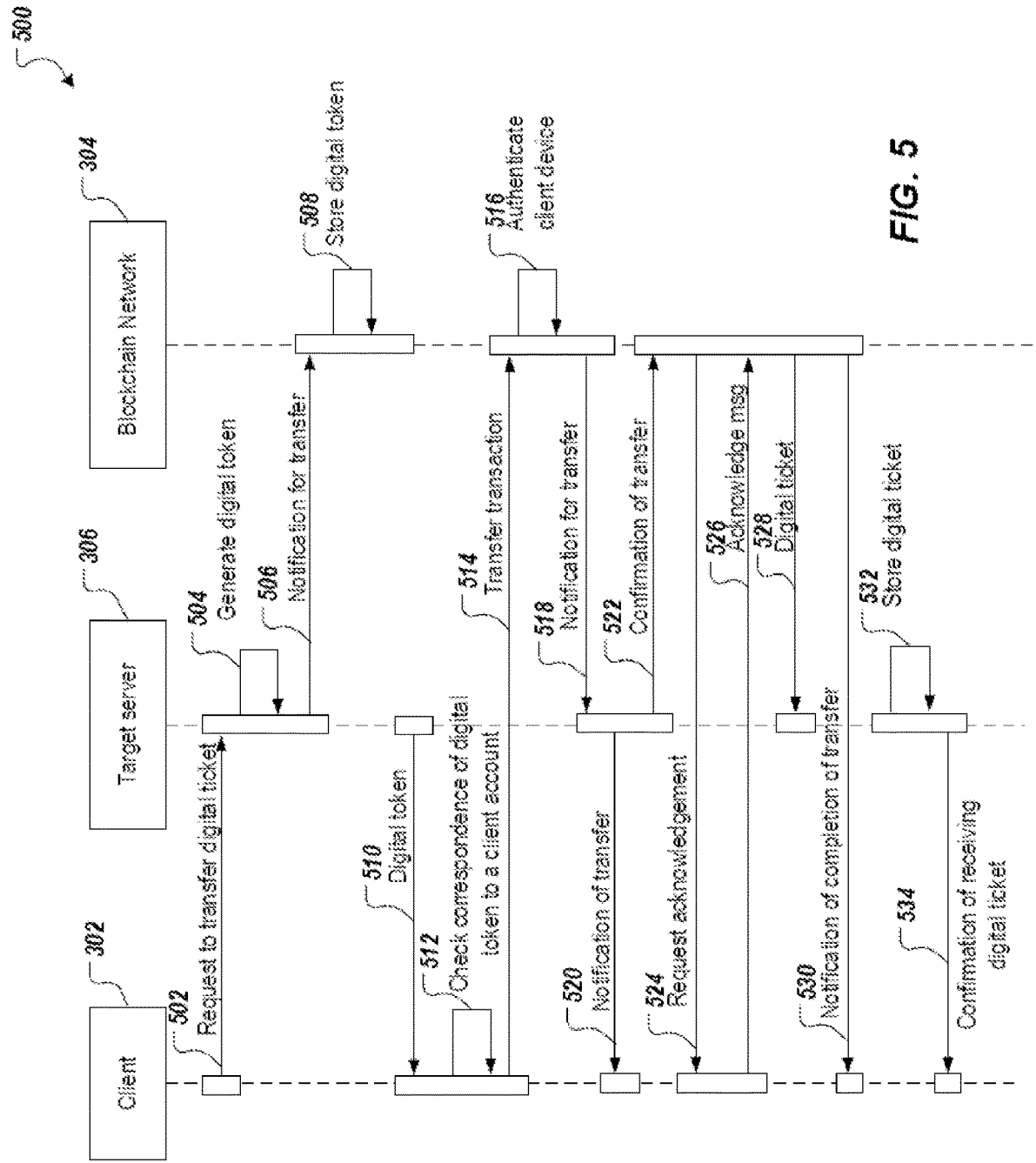
FIG. 5 depicts an example of a process that can be executed in accordance with embodiments of this specification.

FIG. 5 depicts an example of a signal flow 500 in accordance with embodiments of this specification. The signal flow 500 represents a process for transferring a digital ticket based on a blockchain network. For convenience, the process will be described as being performed by a system of one or more computers, located in one or more locations, and programmed appropriately in accordance with this specification. For example, a distributed system (e.g., the system 300 of FIG. 3), appropriately programmed, can perform the process.

At 502, a client device 302 sends a request to the target server 306 to transfer a digital ticket 310 from the blockchain network 304 to the target server 306.

At 504, the target server 306 generates a digital token for the transfer in response to the request. In some embodiments, the digital token can include a random identifiable string, or a two dimensional code (e.g., a bar code or QR code) that corresponds to an account of the client device 302 on the target server 306 and that is recognizable by the target server 306. The digital token can be used to facilitate transfer of the digital ticket 310 from the blockchain network 304 to the target server 306.

At 506, the target server 306 sends a notification message that includes the digital token to the blockchain network 304, the notification message indicating that the digital ticket 310 is to be transferred from the blockchain network 304 to the target server 306. In some embodiments, the target server 306 generates a blockchain transaction that includes the digital token and an account information of the client device 302 on the target server 306, and submits the blockchain transaction to the blockchain network 304.

At 508, the blockchain network 304 stores the digital token and the account information of the client device 302 from the target server 306. In some embodiments, the blockchain network 304 further verifies an identity of the target server 306. In some embodiments, the blockchain network 304 can store blockchain accounts that are registered by external servers, and the external servers that have a registered blockchain account can be authorized for transferring the digital ticket 310. The blockchain network 304 can determine whether an identifier of the target server 306 matches an identifier of a server having a registered blockchain account. If there is a match, the blockchain network 304 can continue the transfer procedure.

At 510, the target server 306 sends the digital token to the client device 302.

At 512, after receiving the digital token from the target server 306, the client device 302 processes the digital token (e.g., scan the bar code or QR code) and checks whether the digital token corresponds to an account of the client device 302, and if so, generates a transfer transaction. In some embodiments, the transfer transaction includes a digital signature of the client device and the digital token that is associated with the digital ticket 310. In some embodiments, if a determination is made that the digital token does not correspond to an account of the client device 302, the client device 302 can terminate the transfer procedure.

At 514, the client device 302 submits the transfer transaction to the blockchain network 304.

At 516, after receiving the transfer transaction from the client device 302, the blockchain network 304 authenticates the client device 302 by verifying the digital signature in the transfer transaction. In some embodiments, the blockchain network 304 can also compare the digital token in the transfer transaction with the digital token previously received from the target server. If the client device 302 is not authenticated and/or the two digital tokens do not match, the blockchain network 304 can terminate the transfer procedure. If the client device 302 is authenticated and the two digital tokens match, the blockchain network can continue the transfer process. In some embodiments, the blockchain network withhold the digital ticket 310 prevent further operations on the digital ticket 310 for a predetermined time.

At 518, the blockchain network 304 sends a notification to the target server 306 indicating that the digital ticket 310 is ready to be transferred from the blockchain network 304 to the target server 306.

At 520, the target server 306 notifies the client device 302 of the digital ticket 310 to be transferred to the target server 3006 from the blockchain network 304. In some embodiments, the digital ticket 310 can be displayed on a graphical user interface of the client device 302.

At 522, the target server 306b sends a confirmation to the blockchain network 304 indicating that the target server 306 is ready to receive the digital ticket 310.

At 524, the blockchain network 304 notifies the client device 302 of that the digital ticket 310 is to be transferred from the blockchain network 304 to the target server 306 and requests acknowledgement from the client device 302.

At 526, the client device 302 sends an acknowledge message to the blockchain network 304 confirming that the blockchain network 304 can transfer the digital ticket 310 to the target server 302.

At 528, the blockchain network 304 transfers the digital ticket 310 to the target server 306. In embodiments where the target server 306 has a blockchain account that is registered in the blockchain network 304, the blockchain network 304 can transfer the digital ticket 310 to the blockchain account of the target server 306.

At 530, the blockchain network 304 notifies the client device 302 of completion of the transfer. At 532, the target server 306 stores the digital ticket 310 and associates the digital ticket 310 with an account of the client device 302 on the target server 306. At 534, the target server 306 sends a confirmation message to the client device 302 indicating that the target server 306 has received the digital ticket 310.

Figure 6:
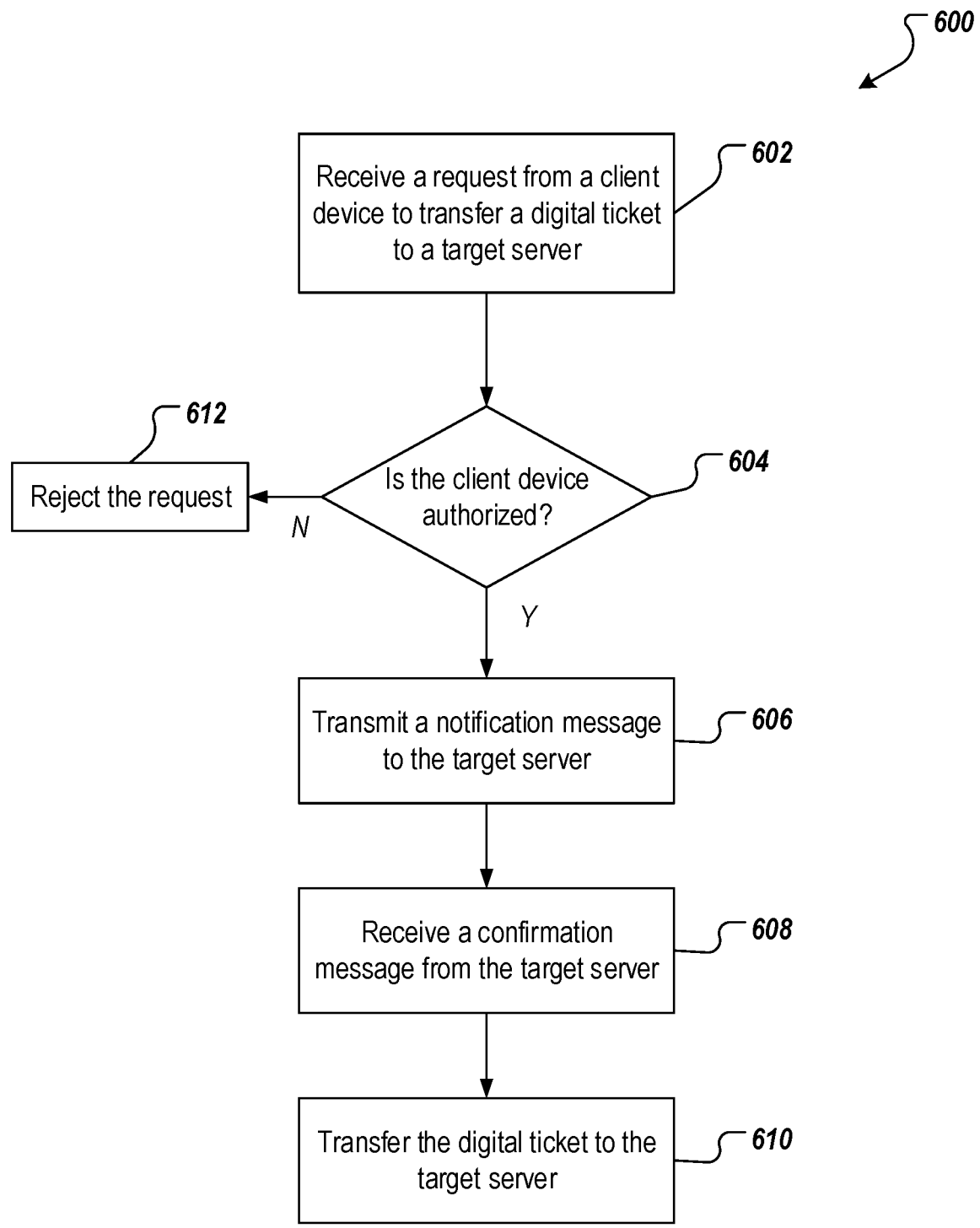
FIG. 6 depicts an example of a process that can be executed in accordance with embodiments of this specification.

FIG. 6 is a flowchart of an example of a process 600 for transferring a digital ticket based on a blockchain network. For convenience, the process 600 will be described as being performed by a system of one or more computers, located in one or more locations, and programmed appropriately in accordance with this specification. For example, a distributed system, e.g., the distributed system 300 of FIG. 3, appropriately programmed, can perform the process 600.

At 602, a blockchain network 304 receives a request from a client device 302 to transfer a digital ticket 310 from the blockchain network 304 to a target server 306. In some embodiments, the request including a digital signature generated using a private key of the client device 302, and an account information of the client device 302 on the target server 306. In some embodiments, the digital ticket includes a virtual instance of a ticket for claiming goods or services. In some embodiments, the target server is located external to the blockchain network.

At 604, the blockchain network determines whether the client device 302 is authorized to transfer the digital ticket 310 based on the digital signature in the request. In some embodiments, the blockchain network determines whether the client device 302 is authorized to transfer the digital ticket 310 by verifying digital signature using a public key that is paired with the private key used to generate the digital signature. If the signature is valid, the blockchain network 304 determines that the client device 302 is authorized to transfer the digital ticket 310 and the process proceeds to step 606. If the signature is not valid, the blockchain network 304 determines that the client device 302 is not authorized to transfer the digital ticket 310 and the process proceeds to step 606 where the request is rejected by the blockchain network 304.

At 606, the blockchain network 304 transmits a notification message to the target server 306 in response to determining that the client device is authorized to transfer the digital ticket. In some embodiments, the notification message includes the account information of the client device 302 and indicates that the digital ticket 310 is to be transferred from the blockchain network 304 to the target server 306.

At 608, the blockchain network 304 receives a confirmation message from the target server 306. In some embodiments, the confirmation message indicates validity of the account information of the client device. In some embodiments, prior to sending the confirmation message, the target server 306 verifies the account information of the client device 302 in response to receiving the notification message from the blockchain network 304. If a determination is made that the account information of the client device 302 is valid, the target server 306 transmits the confirmation message to the blockchain network 304. In some embodiments, the target server 306 transmits a rejection message to the blockchain network 304 if a determination is made that the account information of the client device 302 is not valid. The rejection message indicates that the client device 302 is not allowed to transfer the digital ticket 310 from the blockchain network 304 to the target server 306.

At 610, the blockchain network 304 transfers the digital ticket 310 to the target server 306 in response to confirmation message from the target server 306. In some embodiments, the blockchain network 304 can store blockchain accounts that are registered by external servers, and the external servers that have a registered blockchain account can be authorized for transferring the digital ticket 310. If the target server 306 has a blockchain account that is registered in the blockchain network 304, the blockchain network 304 can transfer the digital ticket 310 to the blockchain account of the target server 306.

Figure 7:
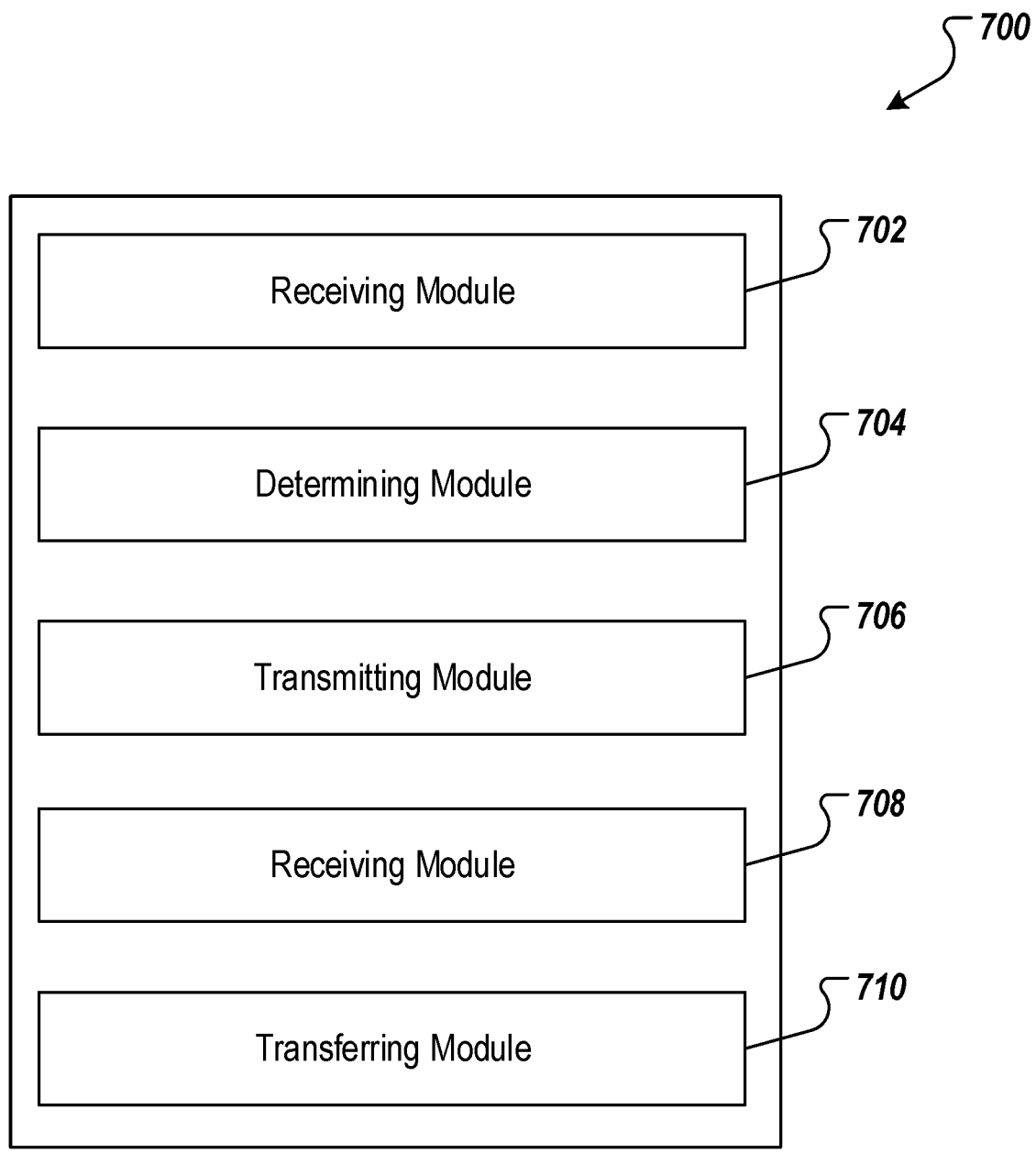
FIG. 7 depicts examples of modules of an apparatus in accordance with embodiments of this specification.

FIG. 7 is a diagram of an example of modules of an apparatus 700 in accordance with embodiments of this specification. The apparatus 700 can be an example of an embodiment of a node of a blockchain network configured to transfer a digital ticket from the blockchain network to a target server. The apparatus 700 can correspond to the embodiments described above, and the apparatus 700 includes the following: a receiving module 702 that receives a request from a client device to transfer a digital ticket from a blockchain network to a target server, the request comprising a digital signature generated using a private key of the client device and account information of the client device on the target server; a determining module 704 that determines whether the client device is authorized to transfer the digital ticket based on the digital signature in response to the request; a transmitting module 706 that transmits a notification message to the target server in response to a determination that client device is authorized to transfer the digital ticket, the notification message comprising the account information of the client device and indicating that the digital ticket is to be transferred from the blockchain network to the target server; a receiving module 708 that receives a confirmation message from the target server, the confirmation message indicating validity of the account information of the client device; and a transferring module 710 that transfers the digital ticket to the target server in response to the confirmation message.

In an optional embodiment, the determining, by the blockchain network node, whether the client device is authorized to transfer the digital ticket based on the signature includes verifying the digital signature using a public key.

In an optional embodiment, the apparatus 700 further includes the following: a rejecting sub-module for rejecting the request from the client device to transfer the digital ticket from the blockchain network to the target server in response to determining that the client device is not authorized to transfer the digital ticket.

In an optional embodiment, the target server is located external to the blockchain network.

In an optional embodiment, the digital ticket comprises a virtual instance of a ticket for claiming goods or services.

In an optional embodiment, the target server verifies the account information of the client device in response to receiving the notification message from the blockchain network node, and wherein the target server transmits the confirmation message to the blockchain network node in response to determining that the account information of the client device is valid.

In an optional embodiment, the target server transmits a rejection message to the blockchain network node in response to determining that the account information of the client device is not valid, the rejection message indicating that the client device is not allowed to transfer the digital ticket from the blockchain network to the target server.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 7, it can be interpreted as illustrating an internal functional module and a structure of a blockchain ticket transferring apparatus. The blockchain ticket transferring apparatus can be an example of a blockchain network node configured to transfer a digital ticket from a blockchain network to a target server. An execution body in essence can be an electronic device, and the electronic device includes the following: one or more processors; and a memory configured to store an executable instruction of the one or more processors.

The techniques described in this specification produce one or more technical effects. In some embodiments, when a client device submits a request to transfer a digital ticket from a blockchain network to a target server, the blockchain network authenticates the client device. In some embodiments, an authenticated client device can be allowed to transfer the digital ticket, while a client device that fails the authentication will be rejected to transfer the digital ticket. This can prevent the data (e.g., the digital ticket) stored in the blockchain network from being compromised by malicious actors, thereby improving the data security of the blockchain network. Furthermore, in some embodiments, the blockchain network verifies whether the target server has registered a blockchain account in the blockchain network. If the target server has a blockchain account in the blockchain network, the target server can receive the digital ticket from the blockchain network. If not, the target server cannot receive the digital ticket. This prevents a malicious account holder imitating the target server from obtaining the digital ticket. This can further improve date security of the blockchain network. Moreover, the transfer procedure as described herein is performed based on blockchain networks. Due to the tamper-resistant and traceable nature of blockchain network, the transfer procedure can be trusted by the participants of the procedure. If the digital ticket is lost or altered during transfer, the transfer procedure can be traced using the blockchain technology and the digital ticket can be correctly retrieved.

Described embodiments of the subject matter can include one or more features, alone or in combination. For example, in a first embodiment, a method for transferring a digital ticket from a blockchain network to a target server includes receiving, by a blockchain network node, a request from a client device to transfer a digital ticket from the blockchain network to a target server, the request comprising a digital signature generated using a private key of the client device and account information of the client device on the target server; in response to the request, determining, by the blockchain network node, whether the client device is authorized to transfer the digital ticket based on the digital signature; in response to determining that the client device is authorized to transfer the digital ticket, transmitting, by the blockchain network node, a notification message to the target server, the notification message comprising the account information of the client device and indicating that the digital ticket is to be transferred from the blockchain network to the target server; receiving, by the blockchain network node, a confirmation message from the target server, the confirmation message indicating validity of the account information of the client device; and in response to the confirmation message, transferring, by the blockchain network node, the digital ticket to the target server. The foregoing and other described embodiments can each, optionally, include one or more of the following features:

A first feature, combinable with any of the following features, specifies that the determining, by the blockchain network node, whether the client device is authorized to transfer the digital ticket based on the signature comprises verifying the digital signature using a public key.

A second feature, combinable with any of the previous or following features, specifies that the method further comprises: in response to determining that the client device is not authorized to transfer the digital ticket, rejecting, by the blockchain network node, the request from the client device to transfer the digital ticket from the blockchain network to the target server.

A third feature, combinable with any of the previous or following features, specifies that the target server is located external to the blockchain network.

A fourth feature, combinable with any of the previous or following features, specifies that the digital ticket comprises a virtual instance of a ticket for claiming goods or services.

A fifth feature, combinable with any of the previous or following features, specifies that the target server verifies the account information of the client device in response to receiving the notification message from the blockchain network node, and the target server transmits the confirmation message to the blockchain network node in response to determining that the account information of the client device is valid.

A sixth feature, combinable with any of the previous or following features, specifies that the target server transmits a rejection message to the blockchain network node in response to determining that the account information of the client device is not valid, the rejection message indicating that the client device is not allowed to transfer the digital ticket from the blockchain network to the target server.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for blockchain network digital ticket transfer, the computer-implemented method comprising:
   receiving, by a blockchain network node of a blockchain network comprising a blockchain, a request from a client device to transfer a digital ticket from the blockchain network to a target server of an electronic trading platform, the request comprising:
      a digital signature generated using a private key of the client device and account information for an account of the client device on the electronic trading platform,
      the account information,
      data identifying the target server; and
      a digital token generated by the target server for the transfer of the digital ticket and sent to the client device, the digital token comprising a code corresponding to the account of the client device on the electronic trading platform;
   in response to receiving the request, determining, by the blockchain network node and based on the digital signature and the digital token, whether the client device is authorized to transfer the digital ticket, including determining whether the digital token matches a previously received digital token received from the target server for the transfer of the digital ticket;
   in response to determining that the client device is authorized to transfer the digital ticket, transmitting, by the blockchain network node, a notification message to the target server, the notification message comprising the account information for the account of the client device on the electronic trading platform and indicating that the digital ticket is to be transferred from the blockchain network to the target server;
   determining, by the blockchain network node that the account of the client device on the electronic trading platform is valid in response to receiving, from the target server, a confirmation message indicating validity of the account of the client device on the electronic trading platform; and
   in response to determining that the account of the client device on the electronic trading platform is valid:
      transmitting, by the blockchain network node, data specifying the digital ticket from the blockchain network to the target server; and
      storing, in the blockchain, data indicating that the digital ticket has been transferred to the target server.

2. The computer-implemented method of claim 1, wherein determining, by the blockchain network node and based on the digital signature and the digital token, whether the client device is authorized to transfer the digital ticket comprises:
   verifying, by the blockchain network node, the digital signature using a public key.

3. The computer-implemented method of claim 1, wherein the target server is externally located in relation to the blockchain network.

4. The computer-implemented method of claim 1, wherein the digital ticket comprises a virtual instance of a ticket for claiming goods or services.

5. The computer-implemented method of claim 1, wherein, in response to receiving the notification message from the blockchain network node, the target server verifies the account information of the client device on the target server, and wherein, in response to determining that the account information of the client device is valid, the target server transmits the confirmation message to the blockchain network node.

6. The computer-implemented method of claim 1, storing, in the blockchain, data indicating that the digital ticket has been removed from an account of the client device in the blockchain network.

7. The computer-implemented method of claim 1, wherein the digital token comprises a two-dimensional code for the account of the client device on the electronic trading platform.

8. A non-transitory, computer-readable storage medium storing one or more instructions executable by a computer system of a blockchain network node to perform operations for blockchain network digital ticket transfer, the operations comprising:
   receiving, by the blockchain network node of a blockchain network comprising a blockchain, a request from a client device to transfer a digital ticket from the blockchain network to a target server of an electronic trading platform, the request comprising:
      a digital signature generated using a private key of the client device and account information for an account of the client device on the electronic trading platform,
      the account information,
      data identifying the target server; and
      a digital token generated by the target server for the transfer of the digital ticket and sent to the client device, the digital token comprising a code corresponding to the account of the client device on the electronic trading platform;
   in response to receiving the request, determining, by the blockchain network node and based on the digital signature and the digital token, whether the client device is authorized to transfer the digital ticket, including determining whether the digital token matches a previously received digital token received from the target server for the transfer of the digital ticket;

in response to determining that the client device is authorized to transfer the digital ticket, transmitting, by the blockchain network node, a notification message to the target server, the notification message comprising the account information for the account of the client device on the electronic trading platform and indicating that the digital ticket is to be transferred from the blockchain network to the target server;

determining, by the blockchain network node that the account of the client device on the electronic trading platform is valid in response to receiving, from the target server, a confirmation message indicating validity of the account of the client device on the electronic trading platform; and in response to determining that the account of the client device on the electronic trading platform is valid:
transmitting, by the blockchain network node, data specifying the digital ticket from the blockchain network to the target server; and
storing, in the blockchain, data indicating that the digital ticket has been transferred to the target server.

9. The non-transitory, computer-readable storage medium of claim 8, wherein determining, by the blockchain network node and based on the digital signature and the digital token, whether the client device is authorized to transfer the digital ticket comprises:
verifying, by the blockchain network node, the digital signature using a public key.

10. The non-transitory, computer-readable storage medium of claim 8, wherein the target server is externally located in relation to the blockchain network.

11. The non-transitory, computer-readable storage medium of claim 8, wherein the digital ticket comprises a virtual instance of a ticket for claiming goods or services.

12. The non-transitory, computer-readable storage medium of claim 8, storing, in the blockchain, data indicating that the digital ticket has been removed from an account of the client device in the blockchain network.

13. The non-transitory, computer-readable storage medium of claim 8, wherein the digital token comprises a two-dimensional code for the account of the client device on the electronic trading platform.

14. A computer-implemented system, comprising:
one or more computers of a blockchain network node of a blockchain network comprising a blockchain; and
one or more computer memory devices interoperably coupled with the one or more computers and having tangible, non-transitory, machine-readable media storing one or more instructions that, when executed by the one or more computers, perform one or more operations for blockchain network digital ticket transfer, the operations comprising:
receiving, by the blockchain network node, a request from a client device to transfer a digital ticket from the blockchain network to a target server of an electronic trading platform, the request comprising:
a digital signature generated using a private key of the client device and account information for an account of the client device on the electronic trading platform,
the account information,
data identifying the target server; and
a digital token generated by the target server for the transfer of the digital ticket and sent to the client device, the digital token comprising a code corresponding to the account of the client device on the electronic trading platform;
in response to receiving the request, determining, by the blockchain network node and based on the digital signature and the digital token, whether the client device is authorized to transfer the digital ticket, including determining whether the digital token matches a previously received digital token received from the target server for the transfer of the digital ticket;
in response to determining that the client device is authorized to transfer the digital ticket, transmitting, by the blockchain network node, a notification message to the target server, the notification message comprising the account information for the account of the client device on the electronic trading platform and indicating that the digital ticket is to be transferred from the blockchain network to the target server;
determining, by the blockchain network node that the account of the client device on the electronic trading platform is valid in response to receiving, from the target server, a confirmation message indicating validity of the account of the client device on the electronic trading platform; and
in response to determining that the account of the client device on the electronic trading platform is valid:
transmitting, by the blockchain network node, data specifying the digital ticket from the blockchain network to the target server; and
storing, in the blockchain, data indicating that the digital ticket has been transferred to the target server.

15. The system of claim 14, wherein determining, by the blockchain network node and based on the digital signature and the digital token, whether the client device is authorized to transfer the digital ticket comprises:
verifying, by the blockchain network node, the digital signature using a public key.

16. The system of claim 14, wherein the target server is externally located in relation to the blockchain network.

17. The system of claim 14, wherein the digital ticket comprises a virtual instance of a ticket for claiming goods or services.

18. The system of claim 14, storing, in the blockchain, data indicating that the digital ticket has been removed from an account of the client device in the blockchain network.

19. The system of claim 14, wherein the digital token comprises a two-dimensional code for the account of the client device on the electronic trading platform.

* * * * *